(12) United States Patent
Williams

(10) Patent No.: US 7,954,630 B2
(45) Date of Patent: Jun. 7, 2011

(54) CONVEYOR BELT

(75) Inventor: Christopher Hugh Williams, Essex (GB)

(73) Assignee: Neopost Technologies, Bagneux (FR)

( * ) Notice: Subject to any disclaimer, the term of this patent is extended or adjusted under 35 U.S.C. 154(b) by 73 days.

(21) Appl. No.: 12/484,617

(22) Filed: Jun. 15, 2009

(65) Prior Publication Data

US 2009/0308715 A1 Dec. 17, 2009

(30) Foreign Application Priority Data

Jun. 16, 2008 (GB) .................................. 0810944.9

(51) Int. Cl.
*B65G 13/02* (2006.01)

(52) U.S. Cl. ..................................... 198/690.2; 198/731

(58) Field of Classification Search ............... 198/690.2, 198/717, 725, 727, 728, 730–733, 850, 853
See application file for complete search history.

(56) References Cited

U.S. PATENT DOCUMENTS

| 3,981,390 | A | * | 9/1976 | Richard ..................... 198/690.2 |
| 4,911,286 | A | | 3/1990 | Herzke |
| 5,469,956 | A | | 11/1995 | Greve et al. |
| 5,725,084 | A | * | 3/1998 | Jager ............................. 198/731 |
| 6,695,135 | B1 | * | 2/2004 | Lapeyre ....................... 198/853 |
| 2007/0238565 | A1 | | 10/2007 | Marler |

FOREIGN PATENT DOCUMENTS

| EP | 0 033 551 A1 | 8/1981 |
| GB | 1 387 948 A | 3/1975 |

* cited by examiner

*Primary Examiner* — James R Bidwell
(74) *Attorney, Agent, or Firm* — Sughrue Mion, PLLC

(57) ABSTRACT

A method of attaching a pawl to a region of a surface of a conveyor belt comprising pre-stressing the surface region and fixing the pawl to the surface region while it is in the pre-stressed state.

24 Claims, 3 Drawing Sheets

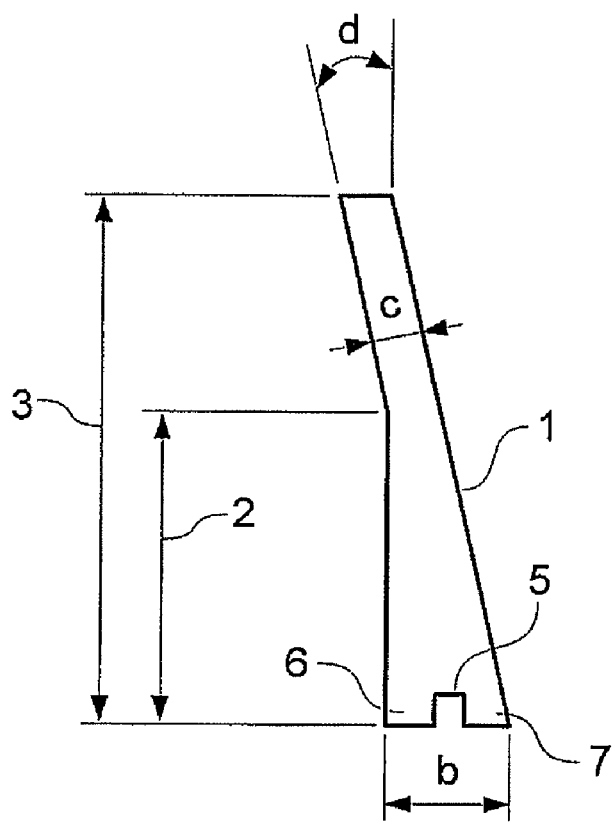 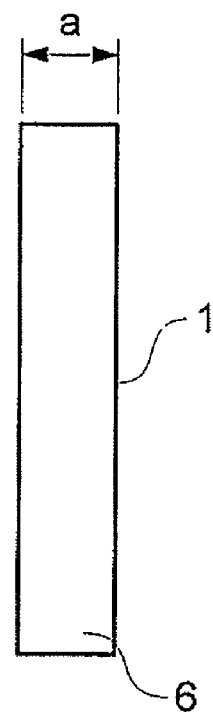
Fig. 1a Fig. 1b

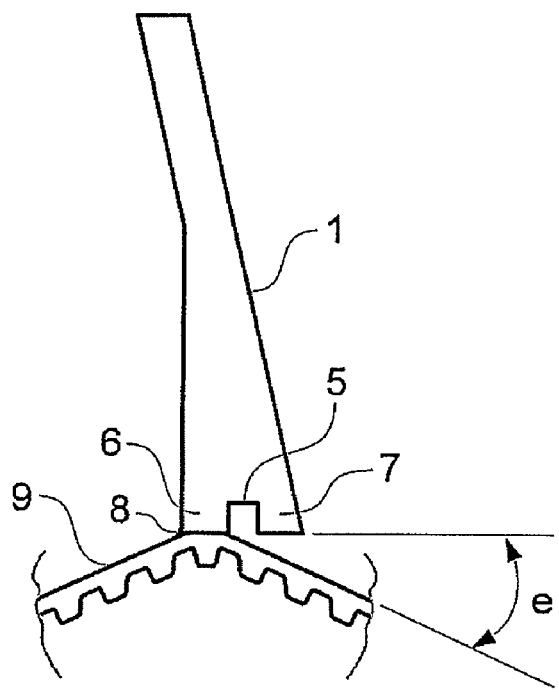
Fig. 2a   Fig. 2b
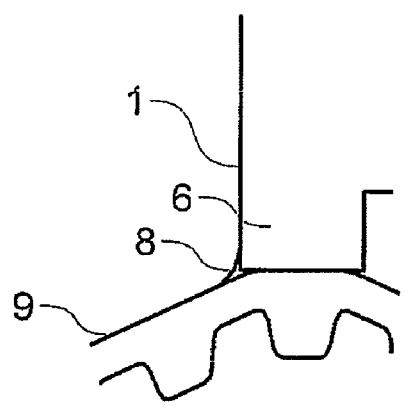
Fig. 3

CONVEYOR BELT

The present invention relates to a conveyor belt and particularly to a belt used in a conveyor system to move articles. The invention has particular application to conveyor belts used in the paper handling industry, for example for an inserter, i.e. a machine for inserting sheets of paper into envelopes.

To move articles such as sheets of paper, a conveyor belt is usually fitted with a series of pawls, commonly known, particularly in the paper handling industry, as flights. These are fixed at spaced intervals to an outer surface of the belt to ensure that the sheets are moved in a positive manner without relying simply on the friction between the belt and the sheet of paper. Such flights must be very accurately attached to the belt to ensure accurate positioning of articles within a paper handling machine, particularly since such machines usually operate at extremely high speeds requiring very tight tolerances. In addition the flights must be very securely attached to ensure that they do not become dislodged during operation since this causes breakdown of the machine, loss of production and potentially damage to parts of the machine. The cost of such belts is not insignificant and it is desirable to avoid the need to replace belts more than necessary.

One known technique for attaching flights to such a belt is by adhesive bonding. The flights are accurately manufactured and finished and then fixed on the surface of the belt with an adhesive bonding compound. The strength of the attachment depends on the strength of the bonding compound when set but high strength bonds are generally difficult to achieve with rubber or polyurethane which are the preferred materials for the belt and the flights.

Another known technique for attaching flights is by welding. The flight is made oversize at the point of contact with the belt and then both components are heated to melting point to weld them together. With a perfect weld the strength of this joint is only limited by the strength of the material of the components.

Flighted belts are usually endless and driven around pulleys in cyclical rotation. The belt is thus tensioned in use to fit around the pulleys and is subject to continuous flexure and stress in operation, particularly as it passes around the pulleys. This causes fatigue in the belt and exerts pressure on the joints between the belt and the flights, in addition to the strain on the joints caused by the articles being conveyed.

The inside surface of the belt (opposite to the surface to which the flights are attached) is usually toothed to aide engagement with the pulleys and/or with mechanical timing features and the combination of the teeth on the inside surface and the flights on the opposite outside surface of the belt also contributes to the stress at the joints between the flights and the belt.

U.S. Pat. No. 4,911,286 describes a conveyor belt with upstanding flights and recognises the problem of stress on the joints between the flights and the belt when the flights catch on a roller abutting the outside surface of the belt on the return leg of the belt travel. It suggests reducing this stress by mounting each flight on a flap in the belt so that the flight is retractable.

U.S. Pat. No. 5,469,956 describes a modular plastic belt and suggest reducing stress on the joints with the flights by attaching the flights using rods positioned at each end of a module of the belt.

According to the present invention there is provided a method of attaching a pawl to a region of a surface of a conveyor belt comprising pre-stressing said surface of the belt and fixing the flight to the surface region while it is in the pre-stressed state.

In one embodiment the fixing step is performed by welding the pawl to the belt. In another embodiment the fixing step is performed by adhesive bonding.

The pre-stressing step may comprise flexing or bending the belt to stretch the outer surface.

Preferably the outer surface of the belt is pre-stressed in the flight fixing region by an amount corresponding to the stretching it would achieve when moving round the smallest pulley in a machine in which it is to be used.

For a better understanding of the present invention and to show how the same may be carried into effect, reference will now be made to the accompanying drawings, in which:

FIG. 1a is a lateral cross-sectional view of a flight or pawl for a conveyor belt;

FIG. 1b is a front cross-sectional view of the flight of FIG. 1a;

FIG. 2a is a lateral cross-sectional view of the flight of FIGS. 1a and 1b attached to a conveyor belt and illustrates the method according to the invention;

FIG. 2b is a front cross-sectional view of the flight and belt of FIG. 2a;

FIG. 3 is an enlarged view of part of FIG. 2a;

Figure 4:
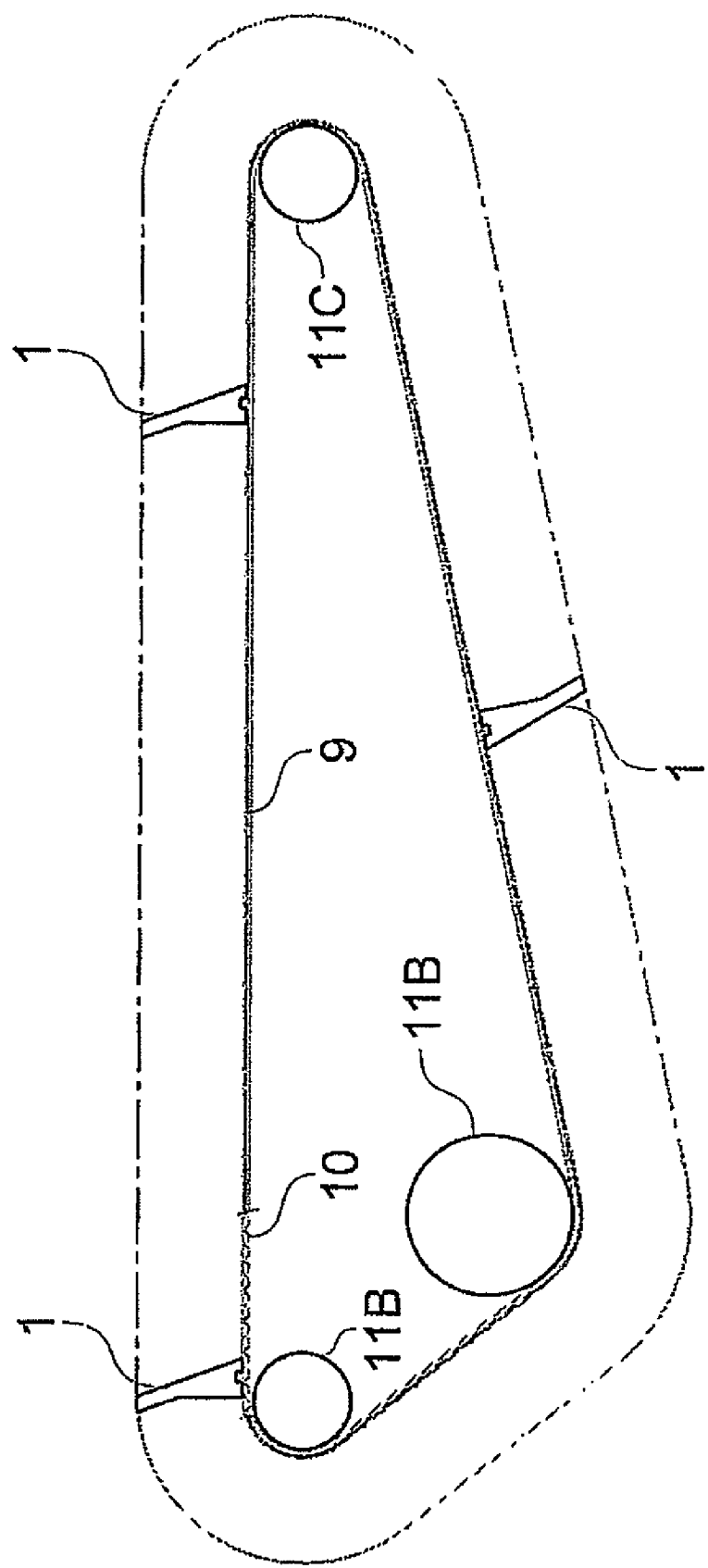
FIG. 4 is a cross-sectional view of a conveyor belt with three pawls attached according to the method of the invention.

In FIGS. 1a and 1b a pawl is shown in the form of a flight 1 for use in the paper handling industry. Typically this is made of 85 shore A polyurethane combined with Kevlar (Registered Trade Mark) material for extra strength. In one embodiment, for use in a paper handling machine, the dimensions of the flight might be as follows, although these dimensions are given as an example only and are not intended to be limiting. The flight 1 could be 10 mm wide (as shown by dimension a) and have a side profile with a tapering lower portion 2 and a sloping upper portion 3. The lower portion 2 is approximately 20 mm high and has a base which is typically about 13 mm long (dimension b) in the direction of travel of the belt, and tapers to about 5 mm (dimension c). The upper section 3 is about 14 mm long and slopes at an angle of about 20 degrees to the vertical (angle d) so as to provide an overhang to assist in retention of an article on the conveyor belt. The base 5 of the flight 1 typically comprises a forward foot 6 to be attached to a conveyor belt, and a back foot 7. As is well known this allows an overall wider base to be used strengthening the flight 1, whilst allowing for flexibility to and positioning the base on a curved surface and provide a rest or support point for the flight 1 when it comes to a flat position.

To mount a flight 1 on the belt 9, according to the method of the invention, the leading and trailing sections of the belt 9, on either side of the position at which a flight is to be attached, are held tight at an angle to the base 9, i.e. to the horizontal as shown in FIGS. 2a and 3. The angle should correspond to the angle which the belt 9 would adopt when turning on the smallest pulley in the machine in which it is to be used. For example for a T5 belt (which is the standard size well known in the industry) for which the minimum is a 22 tooth pulley, the angle would be 16 degrees and the pawl width a maximum of 4 mm. While the belt is held at this angle the flight is attached to the belt surface and is glued or welded at that position. The gluing/welding can create a bulge 8 at the joint, as shown in the enlarged view of FIG. 3. This bulge should preferably be cleaned off, particularly on the leading edge, to a minimum radius of 1 mm.

The glue or weld is allowed to set in this position. Thus, when the belt is in use, the flight to belt joint is in a relatively unstressed condition as it passes around a pulley. This increases the strength of the joint and makes it less prone to fatigue in use. Thus belts made according to this method have a longer life expectancy: tests indicate by a factor of 2 to 5. This saves money in spare parts and reduces downtime for the machines. The inventive method also allows the width of the flight to be increased without increasing stress on the joint, for example for heavy duty applications such as moving heavier items on a conveyor belt.

Without the inventive method the width of a pawl is restricted to less then the pitch of the teeth on the inside of the belt. However, the new method allows flights to be as wide as the pitch of the teeth.

FIG. 4 illustrates a complete endless belt 9 tensioned around three pulley wheels 11A, 11B and 11C. Three flights 1 are fixed at equidistantly spaced intervals on the outer surface. The inside surface of belt 9 has a regular pattern of teeth as shown only in one section 10 for illustrative purposes. These teeth are used to engage pulleys or timing mechanisms.

Typically the flights 1 would be attached to the surface of the belt 9 in matched pairs. Around seven pairs would be equidistantly spaced on the belt outer surface for a T5 belt.

Although this example has been described for a flighted timing belt such as is used in the paper handling industry, the method described applies equally advantageously to any timing belt with pawls attached, regardless of the specific application.

The invention claimed is:

1. A method of attaching a pawl to a region of a surface of a conveyor belt comprising the following steps:
   pre-stressing the surface region in tension; and
   fixing the pawl to the surface region while it is in the pre-stressed tensile state.

2. A method according to claim 1 wherein the fixing step is performed by welding the pawl to the surface region of the belt.

3. A method according to claim 1 wherein the fixing step is performed by adhesive bonding.

4. A method according to claim 1 wherein the pre-stressing step comprises stretching the surface of the belt in the pawl fixing region by an amount corresponding to the stretching it would achieve when moving round the smallest pulley in a machine in which it is to be used.

5. A method according to claim 1 wherein the pre-stressing step comprises bending the belt in the pawl fixing region so that the outer surface on each side of the pawl fixing region subtends an angle to the line of the base of the pawl.

6. A method according to claim 5 wherein the belt is bent at an angle of between 10 and 20 degrees to the base of the pawl.

7. A method according to claim 6 wherein the angle is 16 degrees.

8. A method according to claim 1 comprising wherein the pawl comprises a base with two feet separated by a gap.

9. A method according to claim 8 wherein only the leading foot, in the direction of travel of the belt, is fixed to the belt.

10. A method according to claim 1 further comprising using a belt with teeth formed on the inner surface.

11. A method according to claim 10 comprising fixing to the belt a surface of the base of the pawl which extends in the belt direction a distance corresponding to the pitch of the teeth.

12. A conveyor belt comprising an endless outer surface and a plurality of pawls attached thereto at spaced positions by a method of claim 1.

13. A conveyor belt according to claim 12 adapted for use in a paper handling machine.

14. Conveyor belt apparatus, comprising:
   an endless belt having outer surface and a plurality of pawls attached thereto at spaced positions, wherein at least one pawl comprises a base with two feet, including a leading foot and a trailing foot, separated by a gap, and fixed to the belt outer surface while the surface is in a pre-stressed state.

15. The conveyor belt according to claim 14 wherein only the leading foot, in the direction of travel of the belt, is fixed to the belt.

16. The conveyor belt according to claim 14 wherein the pawl is fixed to the surface by welding.

17. The conveyor belt according to claim 14 wherein the pawl is fixed to the surface by adhesive bonding.

18. The conveyor belt according to claim 14 wherein the surface is pre-stressed by stretching the surface of the belt in the pawl fixing region by an amount corresponding to the stretching it would achieve when moving round the smallest pulley in a machine in which it is to be used.

19. The conveyor belt according to claim 14 wherein the surface is pre-stressed by bending the belt in the pawl fixing region so that the outer surface on each side of the pawl fixing region subtends an angle to the line of the base of the pawl.

20. The conveyor belt according to claim 19 wherein the belt is bent at an angle of between 10 and 20 degrees to the base of the pawl.

21. The conveyor belt according to claim 20 wherein the angle is 16 degrees.

22. The conveyor belt according to claim 14 wherein the belt comprises teeth formed on the inner surface thereof.

23. The conveyor belt according to claim 22 wherein a surface of the base of the pawl which extends in the belt direction a distance corresponding to the pitch of the teeth is fixed to the belt.

24. A paper handling machine comprising conveyor belt apparatus according to claim 14.

* * * * *